Oct. 28, 1941.   G. G. MORIN ET AL   2,260,979
HYDRAULIC DEVICE
Filed April 15, 1938   3 Sheets-Sheet 1

INVENTORS
GEORGE G. MORIN AND
BY EMILE J. CARLETON
Chapin + Neal
ATTORNEYS

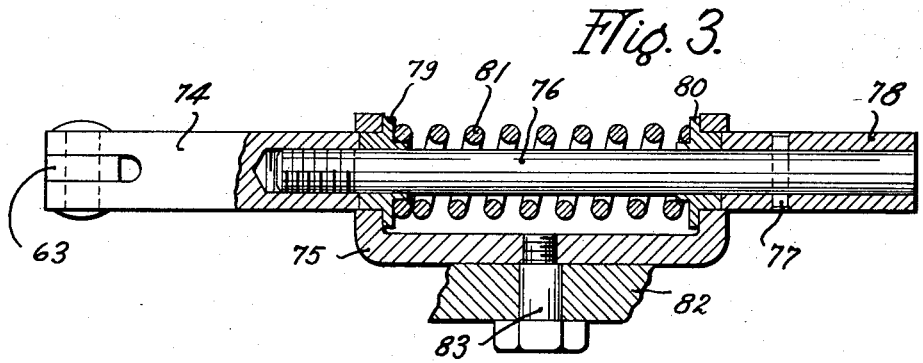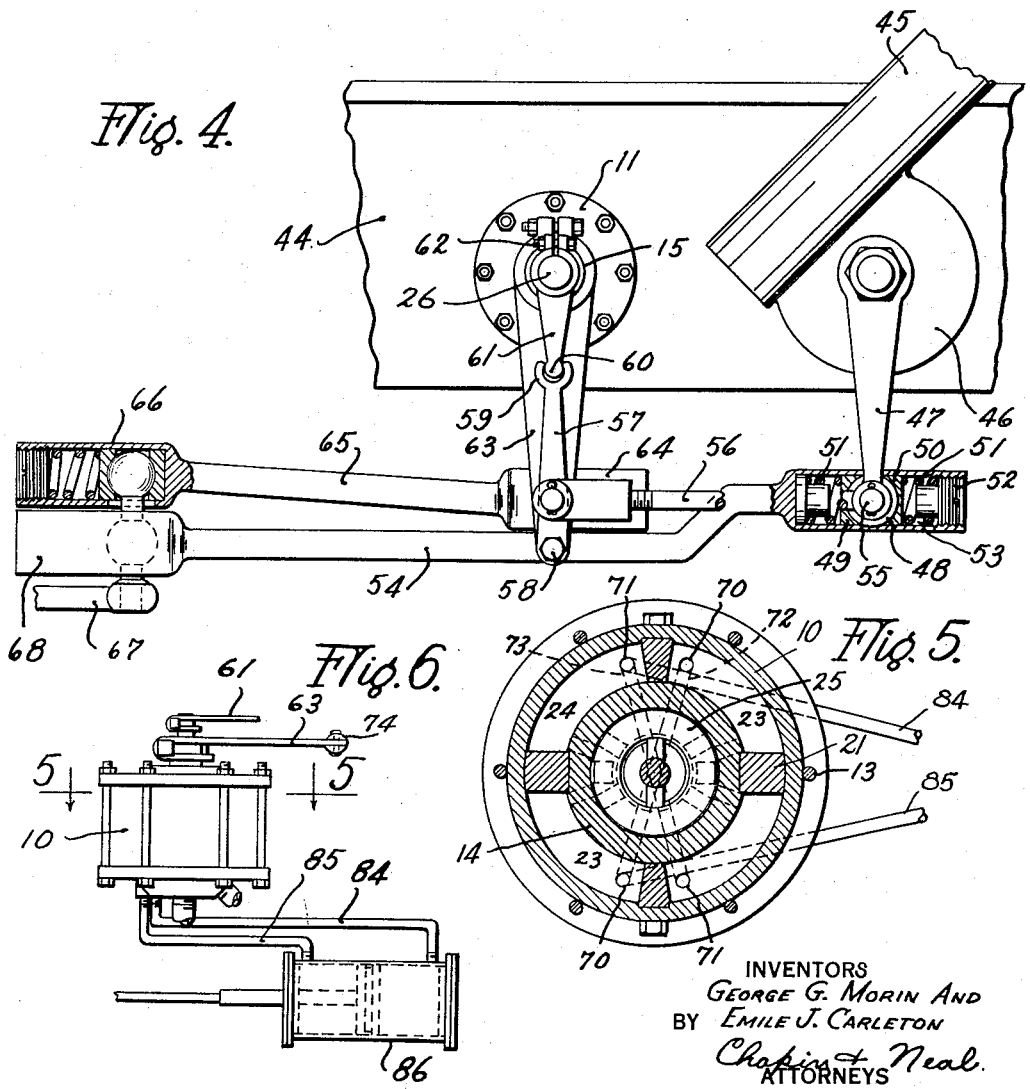

Oct. 28, 1941.    G. G. MORIN ET AL    2,260,979
HYDRAULIC DEVICE
Filed April 15, 1938    3 Sheets-Sheet 3
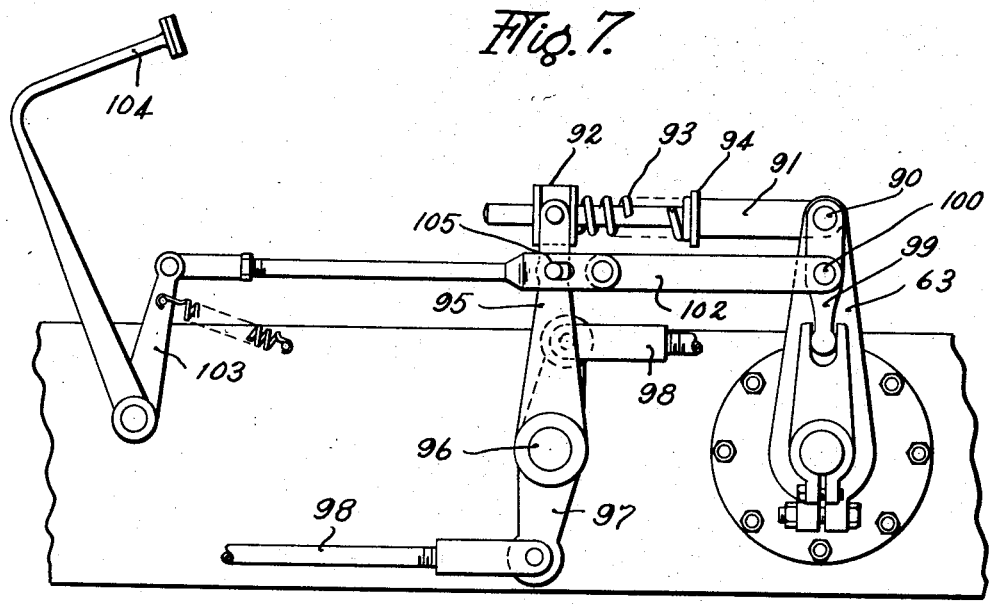
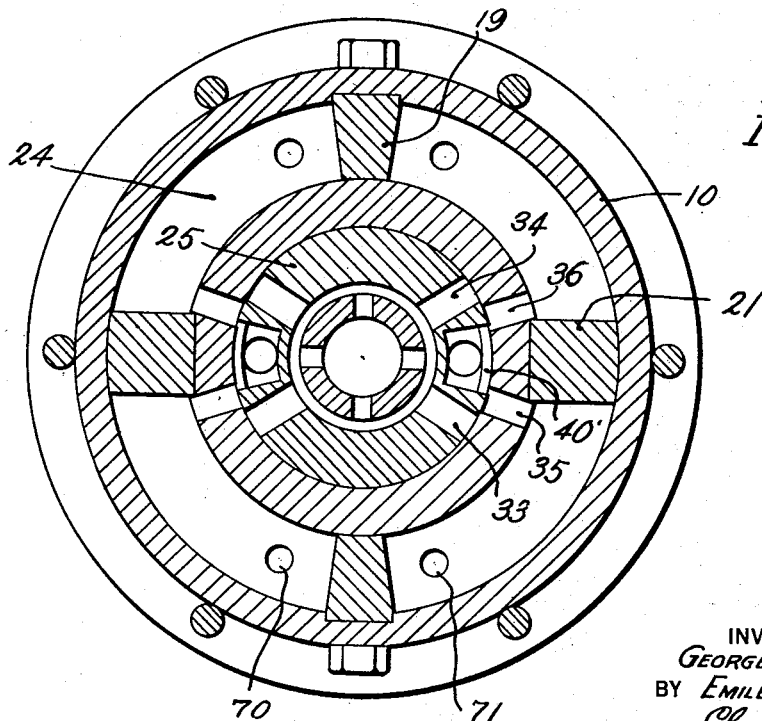
INVENTORS
GEORGE G. MORIN AND
BY EMILE J. CARLETON
Chapin + Neal
ATTORNEYS Patented Oct. 28, 1941

2,260,979

UNITED STATES PATENT OFFICE 2,260,979

HYDRAULIC DEVICE

George G. Morin and Emile J. Carleton, Holyoke, Mass.

Application April 15, 1938, Serial No. 202,262

5 Claims. (Cl. 121—46.5)

This invention relates to a hydraulic control device of very simple construction and having a wide range of utility. In accordance with one feature of the invention the device may be used as a self-contained servo-motor controllable by manual operation and operable by hydraulic pressure so controlled to move an operated mechanism, such as a steering gear or a brake, into predetermined positions without interfering with the manual operation of said mechanism if the hydraulic pressure fails. In accordance with another feature the manner of coupling the device to the steering gear is improved, so that the "feel" of the road will be retained while affording power operation and holding the steering wheel by power against excessive road reaction. In accordance with another feature of the invention the control device may be used to control one or more independent servo-motors and to control said servo-motors so that they will be maintained either under a predetermined hydraulic pressure or in a predetermined position. In accordance with another feature of the invention there is provided a control device of this general character which will be more compact and lighter in weight than prior devices, thereby making possible its use in locations where the bulk or weight of prior devices would render them unadaptable. Additional features will appear from the following description and claims.

Referring to the drawings—

Fig. 3 is a detail, partly in section, of an auxiliary device useful where the control device is employed to control servo-motors by regulating the pressure which they exert;

Fig. 4 is a detail, partly in section, showing the control device arranged to operate the steering mechanism of an automotive vehicle;

Fig. 5 is a section similar to Fig. 2 but on a smaller scale, showing fluid connections employed when the device is used for predetermined pressure control;

Fig. 6 is a diagrammatic view showing the apparatus arranged for predetermined pressure control;

Fig. 7 is a detail showing the device arranged for controlling a brake; and

Fig. 8 is a detail similar to Fig. 2 showing a slight modification.

Figure 1:
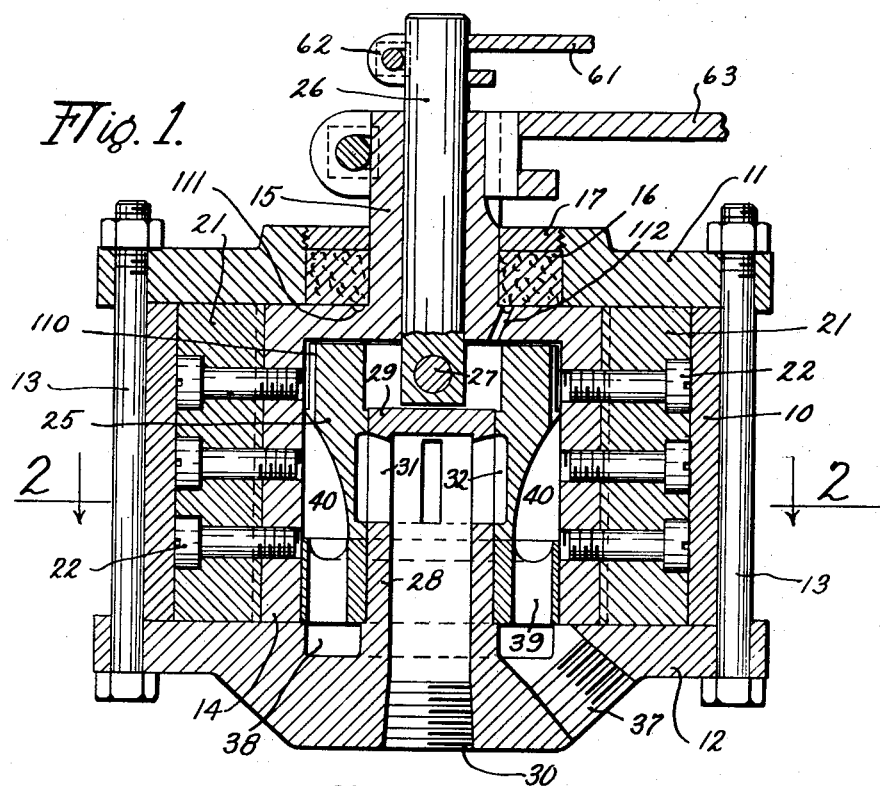
Fig. 1 is a median section through a device embodying the invention.
Figure 2:
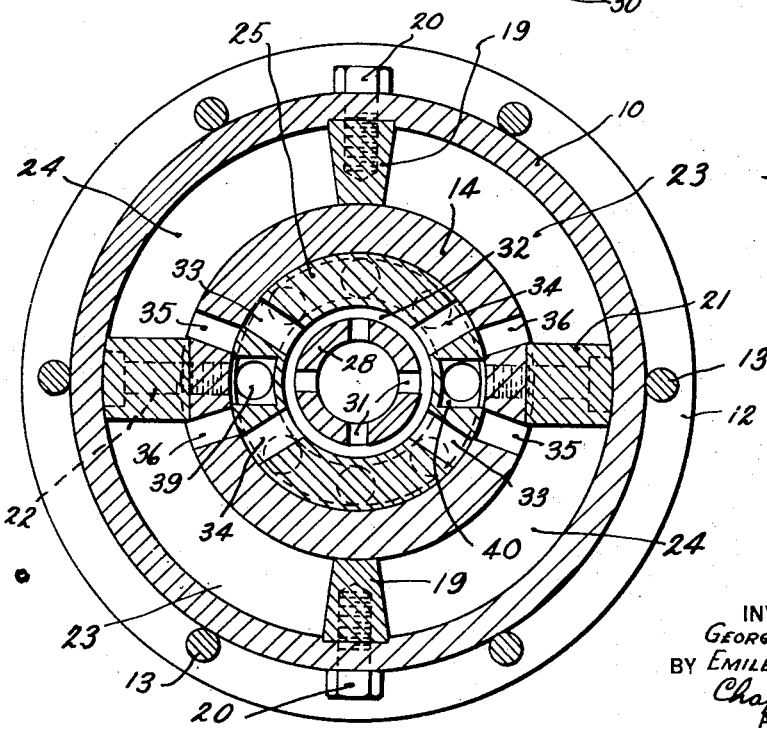
Fig. 2 is a section on line 2—2 of Fig. 1.

Referring first to Figs. 1 and 2, the control device is enclosed within a housing comprising a cylindrical shell 10 and end headers 11 and 12 secured against the end of the shell by tie bolts 13. Fitting snugly between the end headers and spaced radially from the inside of the shell 10 is a cylinder 14 having a shank 15 extending out through a central aperture in the header 11. In order to form a fluid-tight joint a packing 16 is placed around the shank 15 and is held in place by a collar 17 threaded into the header 11. The annular space between the shell 10 and the cylinder 14 is bridged by blocks 19 held by screws 20 to the shell and by blocks 21 held by screws 22 to the cylinder. There are thus formed two opposed pairs of arcuate spaces 23 and 24. Fitting snugly within the cylinder is a control member 25 having a handle 26 secured to it as by a pin 27 and extending outwardly through the shank 15 of the cylinder.

The port structure of the device will now be described. The header 12 has a hollow inward extension 28 closed at its inner end 29 and having its outer end 30 threaded for reception of a pipe connection from a suitable source of pressure. Near its inner end the extension 28 is provided with one or more ports 31 communicating with an annular chamber 32 formed within the control member. The latter chamber communicates with opposed ports 33 and 34 which in certain positions of rotation of the control member will become aligned with ports 35 and 36 formed in the cylinder 14 on opposite sides of the blocks 21. The header 12 also has a threaded connection 37 for connection with a pipe leading to a sump or the inlet of the source of fluid pressure, and opening into an annular chamber 38. Holes 39 in the control member 25 open at one end into this annular chamber and at the other end into ports 40 which in the position shown in Fig. 2 underlie the blocks 21 but which in other positions of rotation of the control members may connect with either the ports 35 or 36.

Before considering the application of the device to specific uses the operation of the parts thus far described will be described briefly. Assuming the fluid pressure to be supplied as indicated and the control member to be rotated a slight amount in a clockwise direction as viewed in Fig. 2, the fluid will pass through ports 31 into the annular chamber 32 and thence through ports 34 and 36 into the arcuate chambers 23. At the same time the arcuate chambers 24 will be connected by the ports 35 and 40 with the outlet pipe 37. The blocks 19 cannot move, as they are fastened to the stationary shell 10; but the blocks 21 are formed with a running fit inside the shell and will be moved clockwise, carrying the cylinder 14 with them. This motion will continue until the ports again assume the relative positions shown in Fig. 2 (although in a different angular position relative to the shell 10 and the blocks 19) and will then cease. The cylinder can be moved in either direction again by shifting the control member to a corresponding position. The result is that the control member can be moved manually, with no substantial resistance to any desired position, and the cylinder 14 will follow it with the full force of the fluid pressure. As thus far described, the device operates to shift the cylinder by power into any predetermined position, the degree and direction of this motion being wholly under the manual control of the operator through the control member.

The relative positions of the ports 33, 35, and 34, 36 is a matter of some importance, and should be regulated in accordance with the use to which the device is to be put. In the neutral position of Fig. 2 the ports 33, 34 should have passed completely beyond their respective ports 35, 36, so that communication between them is cut off; and the outlet port should either be in communication with the ports 35, 36 or just on the verge of such communication to avoid excessive lost motion in the control. Having all ports closed in the neutral position with substantial overlap will however, have definite advantages for some uses. If an incompressible fluid such as oil is used the complete closing of all ports in the neutral position will lock the members 10 and 14 together until the control member is rotated, a matter of some importance in such uses as the steering of automotive vehicles where there is a substantial reaction due to road shocks. In this case, also, the use of a substantial overlap in the ports 33, 35 and 35, 36 has the advantage that if there is shimmying of the wheels the mechanism will not be shifted sufficiently to permit the fluid to pass rapidly and alternately through the ports, a condition which might result in considerable foaming where oil is used as the liquid.

The ports 31 are located entirely within the casing, and no leakage can occur from them to the outside. Every place where leakage can occur is directly or indirectly vented to the exhaust chamber 38, so that no oil is lost but is maintained within the recirculating system. The surface of the member 25 is preferably somewhat relieved, as at 110, to permit any leakage between the members 29 and 25 to vent back to the exhaust line. An annular recess 111 may be provided in the member 14, vented as at 112 to the space between the members 14 and 25, so as to vent off any oil flowing past the end of member 14 near the extension 15. Any flow past the other end will of course find its way directly to the exhaust channel 38.

The application of the device to steering mechanism will now be described in connection with Fig. 4. The housing of the control member is connected in any suitable manner to the side frame 44 of the motor vehicle, the header 11, the control rod 26, and the shank 15 of the cylinder 14 being visible in the drawing. Also attached to the frame 44 is the steering post 45 having any suitable mechanism enclosed within the case 46 from which the steering arm 47 extends. This steering arm has the usual ball 48 on its end, located between blocks 49, 50 held by springs 51 secured by a plug 52 in a housing 53 as is customary. The springs 51, however, are made somewhat lighter than would be the case in a purely manually operable gear, so that they tend to compress a small amount before the steering arm imparts motion to the drag link 54 in the end of which the housing 53 is formed. Also secured to the ball 48, or to an adjacent point on the steering arm, is a pin 55 connecting the arm to a link 56 pinned at the other end to a lever 57 pivoted at 58 to an arm 63 later to be described. The upper end of the lever 57 is forked at 59 to receive the ball end 60 of an arm 61 clamped to the control rod 26 as shown at 62 in Figs. 1 and 4. An arm 63 is clamped to the shank 15 of cylinder 14, and is joined by a ball and socket coupling 64 of the usual type to a link 65. The latter link is coupled by a ball and socket connection 66 to the knuckle arm 67 of the front wheel. The drag link 54 is also coupled to the knuckle arm by a similar ball and socket connection 68.

This form of apparatus functions as follows: If the steering arm 47 is manually displaced through the operation of the steering gear in the usual manner, one of the springs 51 will be compressed, since it is not strong enough to cause motion of the front wheels through the drag link 54, and the rod 56 will be moved since it is joined to the steering arm directly and not through the springs. This causes a motion of the link 56 before the drag link 54 is moved, since the first is coupled directly to the steering arm and the second is coupled to it through the springs 51. The result of this is that the arm 57 is rotated by the link 56 about the then stationary pivot 58, causing rotation of the arm 61 and consequently of the control member 25. In the manner previously described this movement of the control member admits fluid pressure to the chambers 23 or 24 (depending upon which way it was moved) and thus causes the cylinder 14 to rotate a corresponding amount. As the cylinder rotates, the arm 63 is moved, exerting a direct power action on the knuckle arm through the link 65. The same movement of the arm 57 shifts the pivot 58, bringing the arms 57 and 61 once more into alignment, although in a new angular position. The knuckle arm 67 will be held positively in this position by fluid pressure acting through arm 63, no strain being exerted back through the steering arm 47. Should the fluid pressure source fail, however, the steering arm 47 will serve to actuate the drag link 54 manually in the usual way, except that some back lash will be present due to the necessity of compressing the springs 51 before positive movement can take place. The steering mechanism is thus under complete manual control whether or not the fluid pressure is operative.

Certain prior types of power steering devices have been subject to the difficulty that the operator could sense no "feel of the road" in the steering wheel. The present device is not subject to the same objection. When the wheel is first turned it meets a resistance due to the necessity of compressing the springs 51 which are held by the drag link 54. The amount of this resistance can be varied by changing the amount of lap between the ports, a greater lap requiring the arm 61 to be turned further, and therefore the springs 51 to be compressed more, than with a lesser lap.

In the form of mechanism thus far described the rotation of the cylinder 14 creates a definite motion in some driven part proportional to the setting of the control member. It is also possible to utilize the same control member to control the fluid pressure exerted on an outside device. In this latter manner of operation the setting of the control member is proportional to the pressure desired in the device controlled, the direction of pressure being reversible by moving the control member to one side or the other of a neutral position.

For the latter use the opposed chambers 23 and 24 are preferably provided respectively with ports 70 and 71 (Fig. 5), reciprocally joined by conventionally indicated pipes or passageways 72 and 73, a construction which may be utilized in the other use described. By this means the device is at all times kept in balance, since all stresses are diametrically opposed. The arm 63 which has previously been described as extending from the shank 15 of the cylinder 14, is connected to some device which displays a resistance to the motion of the arm roughly proportional to the displacement of the arm or some function thereof. One suitable device for this purpose is shown in Fig. 3.

A member 74, to which the arm 63 is pivoted, is mounted to slide through a stationary yoke 75. A rod 76 is threaded into one end of this member, and is secured as by a pin 77 to an opposed member 78 slidable in the opposite side of the yoke. The rod 76 also slides freely through collars 79 and 80 pressed against the inside of the yoke by a spring 81 and having reduced portions extending into the holes in the yoke. The yoke may be secured to a stationary frame 82 by a bolt 83. If the arm 63 be swung in either direction one of the collars 79 or 80 will be moved inwardly out of contact with the yoke by the contact of the corresponding member 74 or 78 with its outer surface. The opposing collar, being larger than the hole in the yoke, will be held against movement and will act as an abutment for the spring. The advantage of this construction is that as but a single spring need be used, the action in opposite directions is exactly the same, there being no need for matching pairs of springs.

With the device arranged as just described, in which the spring 81 or some equivalent device is used, a given setting of the control member 25 corresponds to a definite compression of the spring. If the control member be moved to some predetermined position the arm 63 will be moved by fluid pressure to a corresponding position and the supply of fluid pressure then cut off as above described. Instead of being trapped within the chambers as in the previous arrangement, however, the fluid in the chambers is coupled through pipes 84 and 85 to some external fluid pressure operated device 86. This is here shown conventionally as a cylinder and piston mechanism which is of course connected to some mechanism upon which it exerts pressure. At the time when the fluid pressure supply is cut off by the closing off of the ports, the resistance offered by the mechanism upon which the device 86 operates is balanced by the pressure on the fluid caused by the reaction of spring 81. This spring tends to assume its neutral position, and thus exerts a back pressure on the fluid through arm 63, cylinder 14, and vanes 21. If, due to the operation of the mechanism to which the cylinder and piston device 86 is connected, the piston is permitted to move so as to increase the volume available for the fluid, the spring 81 can shift the cylinder 14 in a direction to uncover the ports and admit more fluid. By this means the pressure within the chambers and the connected cylinder 86 will be maintained constant at a degree dependent upon the setting of the control shaft 26.

Fig. 8 discloses a valve device similar to that of Figures 1, 2, 5, and 6 with the following modification. The exhaust port is widened as shown in 40' so that when the valve device is in neutral position or when member 25 is moved slightly the exhaust port 40' is in communication with ports 35 and 36 so as to insure the venting of any pressure fluid devices connected to ports 70 and 71.

The type of control device shown in Fig. 2 can also be employed to advantage in the operation of brakes, one example of such an application being shown in Fig. 7. In this case the operating arm 63 is pivoted at 90 to a link 91 sliding through a block 92 and held against it by a spring 93 bearing against a collar 94 supported by a shouldered part of the link. Block 92 is pivoted to the end of an arm 95 secured to a brake operating shaft 96 having the usual rocker 97 joined to links 98. The recessed end of the control lever 61 is engaged by an arm 99 pivoted at 90 to the arm 63. At an intermediate point 100 of the arm 99 is pivoted a link 101 joined at 102 to an arm 103 coupled to the brake operating pedal 104. The link 101 has a pin and slot connection 105 with the arm 95. When the brake pedal is depressed the control lever 61 is shifted and the operating arm 63 swung to actuate the brake. As it moves, the pivot 90 moves, shifting the arm 99 and causing the control and operating arms to come once more into alignment when the operating arm has reached the point determined by the setting of the brake pedal. It will also be observed that the pin and slot connection 105 permits the arm 95 to be operated by direct mechanical connection from the brake pedal in case the hydraulic pressure fails.

We claim:

1. A control valve comprising a cylindrical casing, a sleeve within the casing and spaced radially therefrom, chamber-defining vanes extending between and secured alternately to the casing and to the sleeve, a pair of ports extending through the sleeve on opposite sides of each of the vanes secured to the sleeve, a control member within the sleeve having a plurality of sets of inlet and outlet ports with each set arranged to register with one pair of the ports in the sleeve and each set comprising a pair of inlet ports with an exhaust port intermediate the inlet ports, means for exerting a yielding centralizing force on the sleeve to cause its displacement to vary with the pressure built up in the chambers, and fluid connections from said chambers to a fluid pressure device to be controlled.

2. A control valve comprising a cylindrical casing, a sleeve within the casing and spaced radially therefrom, chamber-defining vanes extending between and secured alternately to the casing and to the sleeve, a pair of ports extending through the sleeve on opposite sides of each of the vanes secured to the sleeve, a control member within the sleeve having a plurality of sets of inlet and outlet ports with each set arranged to register with one pair of the ports in the sleeve and each set comprising a pair of inlet ports with an exhaust port intermediate the inlet ports, means for exerting a yielding centralizing force on the sleeve to cause its displacement to vary with the pressure built up in the chambers, fluid connections between alternate chambers, and fluid connections from said chambers to a fluid pressure device to be controlled.

3. A control valve comprising a casing, a plurality of vanes secured within the casing and projecting inwardly therefrom, a rotor within the casing bearing against said vanes, vanes secured to the rotor and projecting outwardly into contact with the casing intermediate the first-named vanes to form chambers between the casing and the rotor, ports extending through the rotor on each side of the vanes carried thereby, a control member rotatable within the rotor and having pairs of inlet ports and an exhaust port intermediate each pair, said ports being adapted to register with the ports in the rotor, means for supplying fluid under pressure to said inlet ports and for removing it from the exhaust ports, spring means for restisting the rotation of the rotor in both directions with a force varying with the displacement from normal, and means for conducting fluid from said chambers to a fluid pressure operated device, whereby the pressure supplied to said device will be proportional to the displacement of said control member.

4. A control valve comprising a cylindrical casing, a sleeve within the casing and spaced radially therefrom, chamber-defining vanes extending between and secured alternately to the casing and to the sleeve, pairs of ports extending through the sleeve on opposite sides of those vanes secured to the sleeve, a control member within the sleeve having inlet and outlet ports to register with the ports in the sleeve, means for supporting a single compression spring against elongating movement in either direction, means operated by rotation of the sleeve in either direction for compressing the spring to cause displacement of the sleeve to vary with the pressure built up in the chambers, and fluid connections from said chambers to a fluid device to be controlled.

5. A control valve comprising a cylindrical casing, a sleeve within the casing and spaced radially therefrom, chamber-defining vanes extending between and secured alternately to the casing and to the sleeve, pairs of ports extending through the sleeve on opposite sides of those vanes secured to the sleeve, a control member within the sleeve having inlet and outlet ports to register with the ports in the sleeve, a stationary yoke, spring retaining members engaging corresponding opposite surfaces of the yoke, a single spring compressed between said retaining members, a rod extending through the yoke and retaining members, abutments carried by said rod to cause motion of one of the retaining members when the rod is displaced in either direction, means connecting the rod to said sleeve, and fluid connections from said chambers to a fluid device to be controlled.

GEORGE G. MORIN.
EMILE J. CARLETON.